US012639193B2

(12) United States Patent
Wang et al.

(10) Patent No.: US 12,639,193 B2
(45) Date of Patent: May 26, 2026

(54) SYSTEMS AND METHODS FOR RETRIEVAL-AUGMENTED PATCH GENERATION FOR AUTOMATIC PROGRAM REPAIR

(71) Applicant: Salesforce, Inc., San Francisco, CA (US)

(72) Inventors: Yue Wang, Singapore (SG); Weishi Wang, Singapore (SG); Shafiq Rayhan Joty, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 60 days.

(21) Appl. No.: 17/896,873

(22) Filed: Aug. 26, 2022

(65) Prior Publication Data

US 2023/0376401 A1 Nov. 23, 2023

Related U.S. Application Data

(60) Provisional application No. 63/343,264, filed on May 18, 2022.

(51) Int. Cl.
*G06F 11/362* (2025.01)
*G06F 8/65* (2018.01)

(52) U.S. Cl.
CPC ............ *G06F 11/3624* (2013.01); *G06F 8/65* (2013.01)

(58) Field of Classification Search
CPC .............................. G06F 11/3624; G06F 8/65
See application file for complete search history.

(56) References Cited

U.S. PATENT DOCUMENTS

| | | | | |
|---|---|---|---|---|
| 5,822,743 | A * | 10/1998 | Gupta ...................... | G06N 5/04 |
| | | | | 706/50 |
| 9,378,242 | B1 * | 6/2016 | Fontenot ................. | G06F 8/427 |
| 10,169,208 | B1 * | 1/2019 | Moyes ................ | G06F 16/3347 |
| 10,585,780 | B2 | 3/2020 | Muiris et al. | |
| 11,119,889 | B1 * | 9/2021 | Yoshida ............. | G06F 11/3604 |
| 11,544,050 | B1 * | 1/2023 | Ankit ................. | G06F 11/3668 |
| 11,604,626 | B1 * | 3/2023 | Sawant ................... | G06F 8/75 |
| 11,777,984 | B1 * | 10/2023 | Prayaga .............. | H04L 63/1441 |
| | | | | 726/23 |

(Continued)

OTHER PUBLICATIONS

Mashhadi, Ehsan, and Hadi Hemmati. "Applying codebert for automated program repair of java simple bugs." 2021 IEEE/ACM 18th International Conference on Mining Software Repositories (MSR). IEEE, 2021. (Year: 2021).*

(Continued)

*Primary Examiner* — Bradley A Teets
*Assistant Examiner* — Joanne G Macasiano
(74) *Attorney, Agent, or Firm* — Haynes and Boone, LLP

(57) ABSTRACT

Systems and methods for automatic program repair using neural network models are described. After a first buggy code patch is received, a first representation of the first buggy code patch is generated using a retriever encoder of a patch retriever. The patch retriever retrieves, based on the first representation, a first bug-fix code pair from a first plurality of bug-fix code pairs. A first augmented buggy code patch is generated based on the first buggy code patch and the first bug-fix code pair. A patch generator generates a fixed code patch based on the first augmented buggy code patch.

15 Claims, 14 Drawing Sheets

(56) References Cited

U.S. PATENT DOCUMENTS

| | | | | |
|---|---|---|---|---|
| 2003/0145317 A1* | 7/2003 | Chamberlain | ............ | G06F 8/61 |
| | | | | 717/177 |
| 2004/0111719 A1* | 6/2004 | Civlin | ........................ | G06F 8/60 |
| | | | | 717/151 |
| 2018/0276103 A1 | 9/2018 | Woulfe et al. | | |
| 2019/0391904 A1 | 12/2019 | Navin et al. | | |
| 2021/0182031 A1 | 6/2021 | Ye et al. | | |
| 2021/0271587 A1* | 9/2021 | Miller | .................... | G06N 20/00 |
| 2021/0357307 A1* | 11/2021 | Deng | ..................... | G06N 3/084 |
| 2022/0012021 A1* | 1/2022 | Abhinav | .............. | G06N 3/0455 |
| 2022/0083450 A1 | 3/2022 | Darragh et al. | | |

OTHER PUBLICATIONS

Drain, Dawn, et al. "Generating bug-fixes using pretrained transformers." Proceedings of the 5th ACM SIGPLAN International Symposium on Machine Programming. 2021. (Year: 2021).*

Wang, Yue, et al. "Codet5: Identifier-aware unified pre-trained encoder-decoder models for code understanding and generation." arXiv preprint arXiv:2109.00859 (2021). (Year: 2021).*

Ahmadi, Mansour, et al. "Finding bugs using your own code: detecting functionally-similar yet inconsistent code." 30th USENIX security symposium (USENIX Security 21). 2021. (Year: 2021).*

Tian, Haoye, et al. "Evaluating representation learning of code changes for predicting patch correctness in program repair." Proceedings of the 35th IEEE/ACM international conference on automated software engineering. 2020. (Year: 2020).*

International Search Report and Written Opinion for PCT/US2023/021133, dated Aug. 22, 2023, 11 pages.

Berabi et al., Tfix: Learning to Fix Coding Errors with a Text-to-Text Transformer, Proceedings of Machine Learning Research (PMLR), vol. 139, pp. 780-791, 2021.

Lin et al., Orange: a Method for Evaluating Automatic Evaluation Metrics for Machine Translation, Coling, 2004, 7 Pages.

Tufano et al., An Empirical Study on Learning Bug-Fixing Patches in the Wild via Neural Machine Translation, ACM Trans. Softw. Eng. Methodol., vol. 28, No. 4, 2019, pp. 1-29.

Wang et al., CodeT5: Identifier-aware Unified Pre-trained Encoder-Decoder Models for Code Understanding and Generation, EMNLP, Association for Computational Linguistics, 8696-8708, 2021.

Wang, W., et al., "RAP-Gen: Retrieval-Augmented Patch Generation with CodeT5 for Automatic Program Repair," Sep. 12, 2023, arXiv:2309.06057v1 [cs.SE], 13 pages.

* cited by examiner

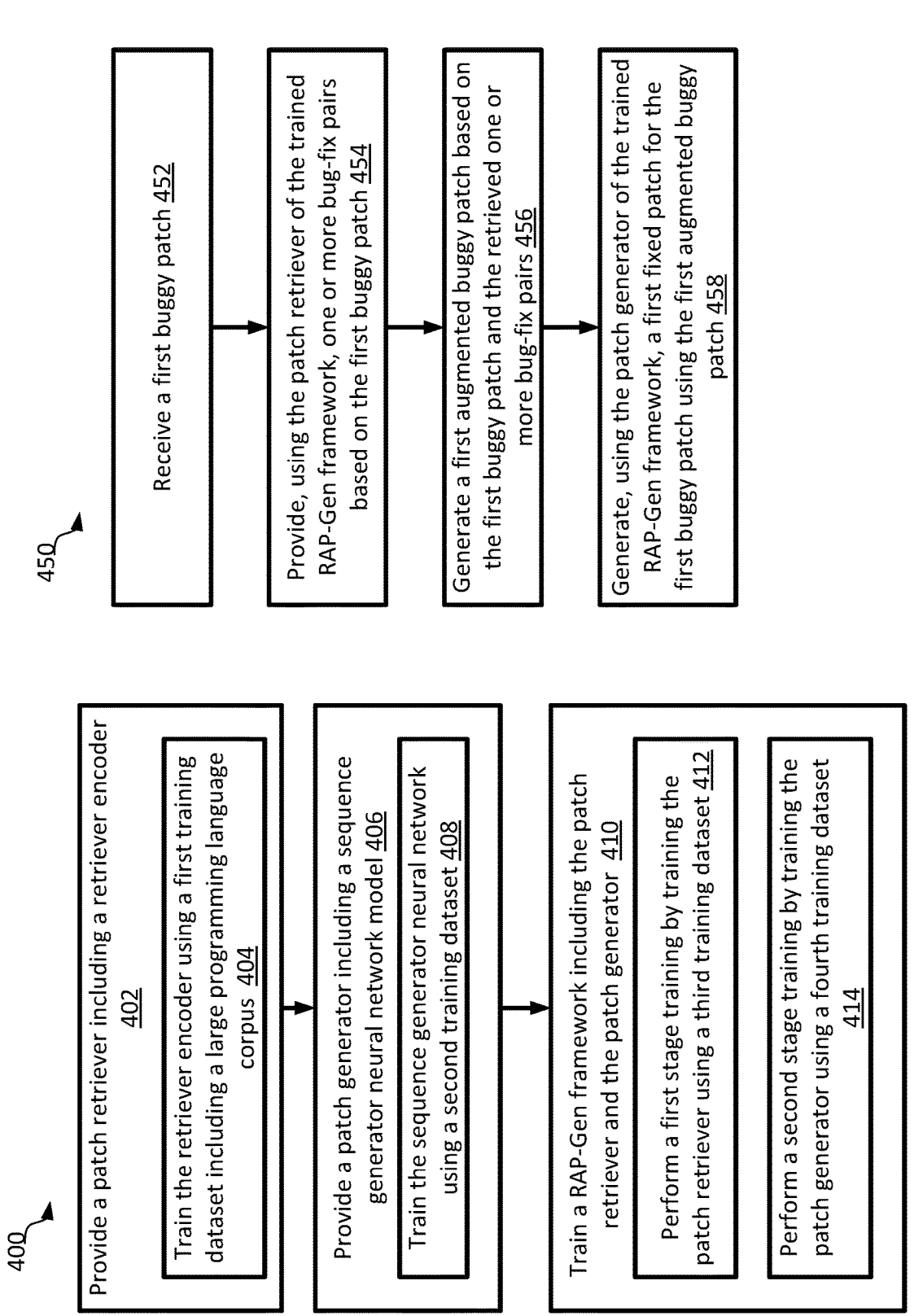

400

Provide a patch retriever including a retriever encoder 402

Train the retriever encoder using a first training dataset including a large programming language corpus 404

Provide a patch generator including a sequence generator neural network model 406

Train the sequence generator neural network using a second training dataset 408

Train a RAP-Gen framework including the patch retriever and the patch generator 410

Perform a first stage training by training the patch retriever using a third training dataset 412

Perform a second stage training by training the patch generator using a fourth training dataset 414

Receive a first buggy patch 452

Provide, using the patch retriever of the trained RAP-Gen framework, one or more bug-fix pairs based on the first buggy patch 454

Generate a first augmented buggy patch based on the first buggy patch and the retrieved one or more bug-fix pairs 456

Generate, using the patch generator of the trained RAP-Gen framework, a first fixed patch for the first buggy patch using the first augmented buggy patch 458

FIG. 4B

| Benchmark | Version | Train | Valid | Test | All |
|---|---|---|---|---|---|
| TFix | Original | 84,846 | 9,454 | 10,504 | 104,804 |
| TFix | Dedup | 84,673 | 9,423 | 10,465 | 104,561 |
| Code Refinement | Small | 46,680 | 5,835 | 5,835 | 58,350 |
| Code Refinement | Medium | 52,364 | 6,545 | 6,545 | 65,454 |

Table 1: Statistics of two program repair benchmarks.

FIG. 5

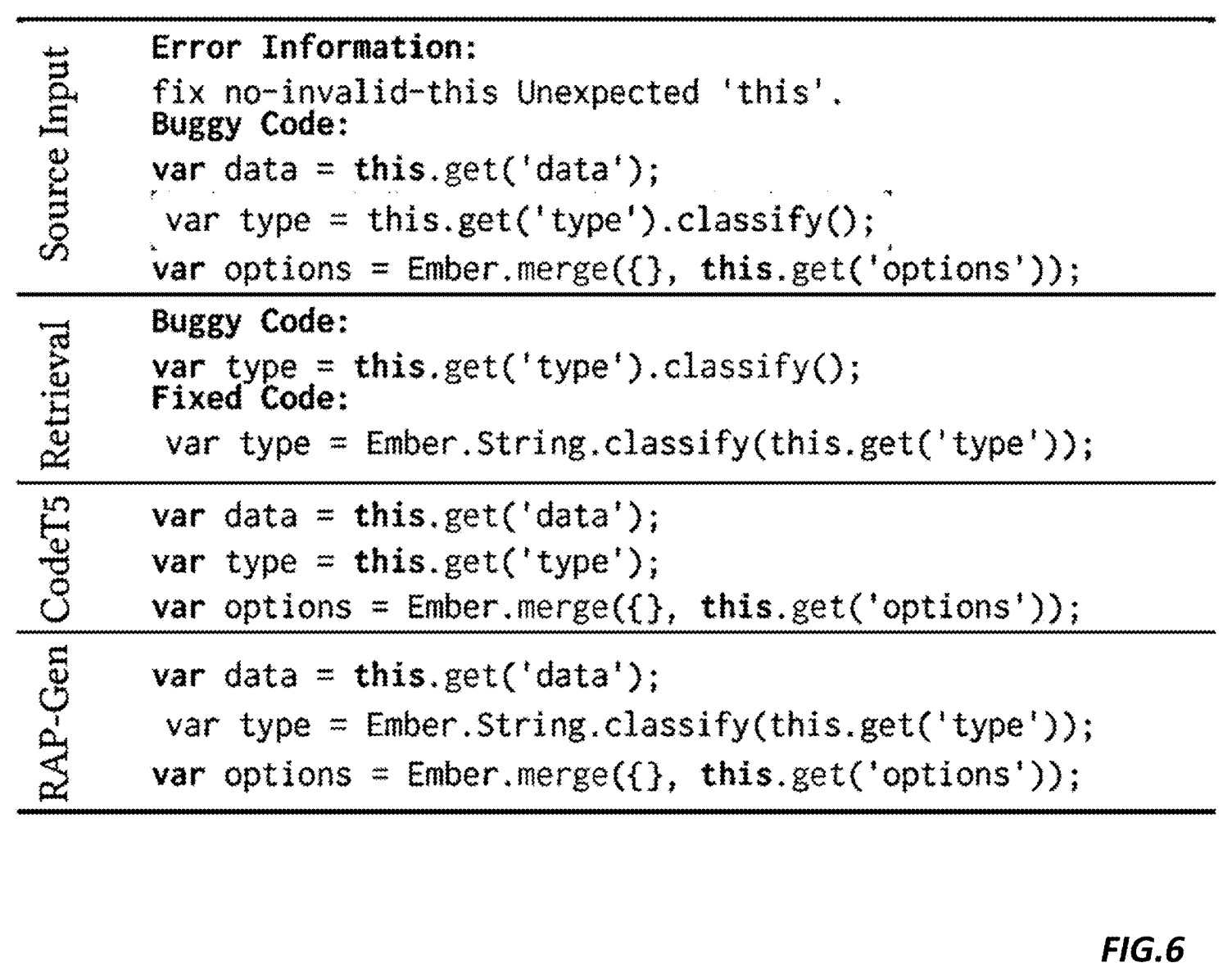

| | |
|---|---|
| Source Input | Error Information:<br>fix no-invalid-this Unexpected 'this'.<br>Buggy Code:<br>`var data = this.get('data');`<br>`var type = this.get('type').classify();`<br>`var options = Ember.merge({}, this.get('options'));` |
| Retrieval | Buggy Code:<br>`var type = this.get('type').classify();`<br>Fixed Code:<br>`var type = Ember.String.classify(this.get('type'));` |
| CodeT5 | `var data = this.get('data');`<br>`var type = this.get('type');`<br>`var options = Ember.merge({}, this.get('options'));` |
| RAP-Gen | `var data = this.get('data');`<br>`var type = Ember.String.classify(this.get('type'));`<br>`var options = Ember.merge({}, this.get('options'));` |

*FIG.6*

Figure 7:
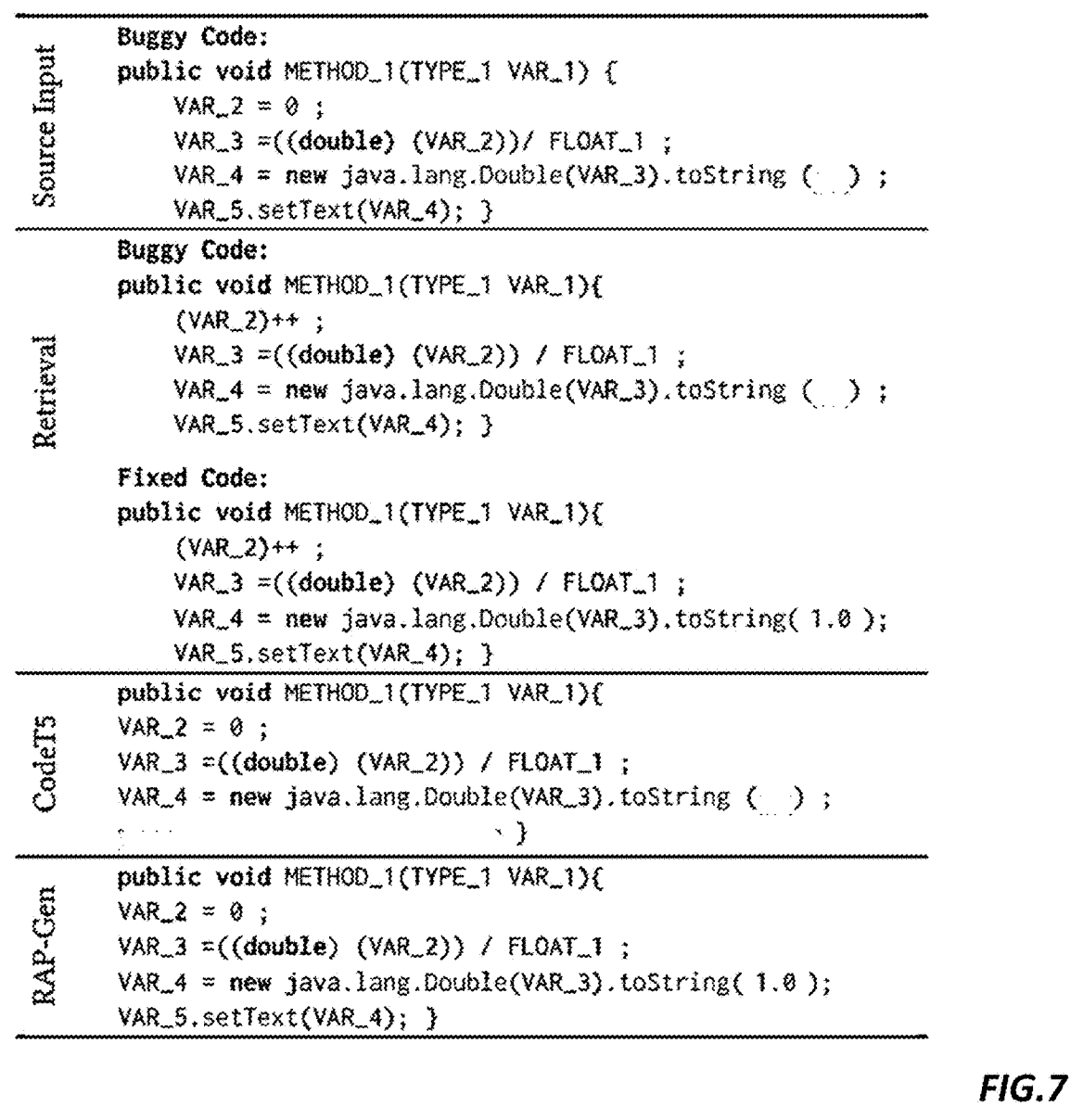

Source Input

Buggy Code:
```
public void METHOD_1(TYPE_1 VAR_1) {
    VAR_2 = 0 ;
    VAR_3 =((double) (VAR_2))/ FLOAT_1 ;
    VAR_4 = new java.lang.Double(VAR_3).toString( ) ;
    VAR_5.setText(VAR_4); }
```

Retrieval

Buggy Code:
```
public void METHOD_1(TYPE_1 VAR_1){
    (VAR_2)++ ;
    VAR_3 =((double) (VAR_2)) / FLOAT_1 ;
    VAR_4 = new java.lang.Double(VAR_3).toString( ) ;
    VAR_5.setText(VAR_4); }
```

Fixed Code:
```
public void METHOD_1(TYPE_1 VAR_1){
    (VAR_2)++ ;
    VAR_3 =((double) (VAR_2)) / FLOAT_1 ;
    VAR_4 = new java.lang.Double(VAR_3).toString( 1.0 );
    VAR_5.setText(VAR_4); }
```

CodeT5

```
public void METHOD_1(TYPE_1 VAR_1){
    VAR_2 = 0 ;
    VAR_3 =((double) (VAR_2)) / FLOAT_1 ;
    VAR_4 = new java.lang.Double(VAR_3).toString( ) ;
```

RAP-Gen

```
public void METHOD_1(TYPE_1 VAR_1){
    VAR_2 = 0 ;
    VAR_3 =((double) (VAR_2)) / FLOAT_1 ;
    VAR_4 = new java.lang.Double(VAR_3).toString( 1.0 );
    VAR_5.setText(VAR_4); }
```

Source Input

```
Error Information:
fix no-console Unexpected console statement.
Buggy Code:
if (message.error) {
    console.log(message,error);
    return event.sender.send("error"); }
```

CodeT5 Retrieval

```
Buggy Code:
console.log(error.message);
Fixed Code:
log.error(error.message);
```

```
if (message.error) {
    return event.sender.send("error"); }
```

RAP-Gen

```
if (message.error) {
    logger.error(message.error);
    return event.sender.send("error"); }
```

*FIG. 9*

| Model | EM w/ spaces | | EM w/o spaces | | BLEU-4 |
|---|---|---|---|---|---|
| | Avg. | W. Avg. | Avg. | W. Avg. | |
| Naive Copy | 0.00 | 0.00 | 0.00 | 0.00 | 40.58 |
| SequenceR | 17.90 | - | - | - | - |
| CoCoNuT | 11.70 | - | - | - | - |
| T5-small (60M) | 44.46 | 44.44 | 44.52 | 44.60 | 74.51 |
| T5-base (220M) | 48.54 | 47.63 | 48.72 | 47.70 | 75.75 |
| T5-large (770M) | 49.33 | 49.65 | 49.35 | 49.70 | 76.98 |
| CodeT5-small (60M) | 47.14 | 46.35 | 50.22 | 50.31 | 77.74 |
| ↪ deduplicate | 46.54 | 46.02 | 49.58 | 49.96 | 77.42 |
| - error-info | 45.97 | 45.80 | 49.26 | 49.70 | 76.71 |
| CodeT5-base (220M) | 50.88 | 49.42 | 54.30 | 53.57 | 78.85 |
| ↪ deduplicate | 50.63 | 49.35 | 54.21 | 53.46 | 78.92 |
| - error-info | 46.88 | 47.17 | 50.36 | 51.25 | 77.64 |

Table 2: Comparison between CodeT5 models and other baselines on TFix. "W. Avg." denotes the weighted average EM score (%). Best results in each column are in bold.

| Model | EM | BLEU-4 |
|---|---|---|
| T5-large (TFix) | 49.58 | 76.96 |
| CodeT5-small | 49.96 | 77.42 |
| RAP-Gen-small | | |
| +Random | 49.77 | 77.21 |
| +BM25 | 52.98 | 78.98 |
| +DPR | 53.03 | 79.20 |
| +Hybrid | 53.30 | 79.30 |
| CodeT5-base | 53.46 | 78.92 |
| RAP-Gen-base | | |
| +Random | 52.98 | 78.52 |
| +BM25 | 53.88 | 79.18 |
| +DPR | 53.93 | 79.59 |
| +Hybrid | 54.15 | 79.66 |

Table 3: Performance of RAP-Gen on the deduplicated TFix.

FIG. 10

| Model | Error Removal | Exact Match | BLEU-4 |
|---|---|---|---|
| T5-large (TFix) | 69.3 | 50.73 | 77.99 |
| RAP-Gen-small | 79.9 | 54.34 | 79.88 |
| RAP-Gen-base | 78.7 | 55.17 | 80.36 |

Table 4: Error removal comparison on a test subset of TFix.

FIG. 11

| Model | Small | | Medium | |
|---|---|---|---|---|
| | EM | BLEU-4 | EM | BLEU-4 |
| Naive Copy | 0.00 | 78.06 | 0.00 | 90.91 |
| LSTM | 10.00 | 76.76 | 2.50 | 72.08 |
| Transformer | 14.70 | 77.21 | 3.70 | 89.23 |
| RoBERTa (code) | 15.90 | 77.30 | 4.10 | 90.07 |
| CodeBERT | 16.40 | 77.42 | 5.16 | 91.07 |
| GraphCodeBERT | 17.30 | 80.02 | 9.10 | 91.31 |
| PLBART | 19.21 | 77.02 | 8.98 | 88.50 |
| CoTexT | 21.58 | 77.28 | 13.11 | 88.40 |
| NSEdit | 24.04 | 71.06 | 13.87 | 85.72 |
| CodeT5-small | 19.06 | 76.23 | 10.92 | 89.20 |
| CodeT5-small (multi-task) | 20.94 | 77.03 | 11.11 | 87.51 |
| RAP-Gen-small | | | | |
| +Random | 20.78 | 77.62 | 13.08 | 88.52 |
| +BM25 | 21.90 | 77.33 | 13.56 | 89.48 |
| +DPR | 23.65 | 78.02 | 13.98 | 88.95 |
| +Hybrid | 23.84 | 77.91 | 14.27 | 88.94 |
| CodeT5-base | 21.61 | 77.43 | 13.96 | 87.64 |
| CodeT5-base (multi-task) | 22.59 | 78.06 | 14.18 | 88.90 |
| RAP-Gen-base | | | | |
| +Random | 21.25 | 76.97 | 15.13 | 89.83 |
| +BM25 | 23.82 | 78.83 | 15.37 | 89.42 |
| +DPR | 24.37 | 78.54 | 15.60 | 89.82 |
| +Hybrid | 24.80 | 78.28 | 15.84 | 90.01 |

Table 5: Performance of RAP-Gen on the Code Refinement.

FIG. 12

| Retriever | TFix | | Refine-Small | | Refine-Medium | |
|---|---|---|---|---|---|---|
| | BLEU-4 | CosSim | BLEU-4 | CosSim | BLEU-4 | CosSim |
| Random | 0.1 | 35.5 | 14.6 | 35.4 | 14.6 | 30.6 |
| BM25 | 23.7 | 70.9 | 41.5 | 68.5 | 39.0 | 66.6 |
| DPR | 21.7 | 75.4 | 54.4 | 84.9 | 44.3 | 81.3 |
| Hybrid | 24.4 | 73.4 | 57.4 | 84.2 | 45.0 | 80.9 |

Table 6: Lexical (BLEU-4) and semantic (CosSim) retrieval matching results on TFix and Code Refinement benchmarks.

FIG. 13

| Error Type | #Test | T5-large | CodeT5-small | RAP-Gen-small | CodeT5-base | RAP-Gen-base |
|---|---|---|---|---|---|---|
| no-new-symbol | 1 | 100.00 | 100.00 | 100.00 | 100.00 | 100.00 |
| no-compare-neg-zero | 2 | 0.00 | 0.00 | 0.00 | 0.00 | 0.00 |
| no-ex-assign | 4 | 25.00 | 25.00 | 50.00 | 50.00 | 25.00 |
| for-direction | 5 | 40.00 | 80.00 | 60.00 | 60.00 | 60.00 |
| no-unsafe-finally | 7 | 42.86 | 14.29 | 28.57 | 14.29 | 14.29 |
| use-isnan | 8 | 37.50 | 25.00 | 25.00 | 50.00 | 25.00 |
| no-class-assign | 12 | 41.67 | 33.33 | 50.00 | 50.00 | 50.00 |
| no-dupe-class-members | 12 | 8.33 | 0.00 | 8.00 | 16.67 | 8.33 |
| no-func-assign | 15 | 46.67 | 53.33 | 60.00 | 46.67 | 60.00 |
| no-empty-pattern | 18 | 27.78 | 38.89 | 50.00 | 44.44 | 44.44 |
| no-unused-labels | 19 | 52.63 | 52.63 | 57.89 | 63.16 | 63.16 |
| no-duplicate-case | 28 | 65.00 | 68.00 | 60.00 | 70.00 | 60.00 |
| getter-return | 21 | 52.38 | 61.90 | 57.14 | 57.14 | 61.90 |
| no-sparse-arrays | 24 | 25.00 | 37.50 | 33.33 | 45.83 | 45.83 |
| no-const-assign | 28 | 35.71 | 39.29 | 42.86 | 35.71 | 42.86 |
| no-global-assign | 32 | 59.38 | 59.38 | 68.75 | 59.38 | 68.75 |
| no-new-wrappers | 36 | 27.78 | 38.89 | 44.44 | 47.22 | 38.89 |
| no-this-before-super | 42 | 47.62 | 52.38 | 57.14 | 54.76 | 69.03 |
| no-unsafe-negation | 43 | 72.09 | 69.77 | 72.09 | 76.74 | 76.74 |
| require-yield | 43 | 72.09 | 69.77 | 74.42 | 76.74 | 76.74 |
| no-extend-native | 45 | 31.11 | 22.22 | 35.56 | 40.00 | 26.67 |
| no-new-object | 45 | 71.11 | 64.44 | 68.89 | 88.89 | 66.67 |
| no-caller | 45 | 20.00 | 20.00 | 24.44 | 26.67 | 22.22 |
| constructor-super | 47 | 59.57 | 63.83 | 61.70 | 72.34 | 70.21 |
| valid-typeof | 54 | 51.85 | 53.70 | 55.56 | 55.56 | 51.85 |
| no-self-assign | 61 | 34.43 | 45.90 | 47.54 | 40.98 | 44.26 |
| no-extra-bind | 68 | 70.59 | 70.59 | 75.00 | 73.53 | 73.53 |
| no-case-declarations | 73 | 58.90 | 56.16 | 63.01 | 64.38 | 67.12 |
| no-fallthrough | 75 | 76.00 | 72.00 | 76.00 | 73.33 | 77.33 |
| no-inner-declarations | 84 | 38.10 | 39.29 | 53.57 | 48.81 | 46.43 |
| no-array-constructor | 98 | 86.73 | 86.73 | 85.71 | 86.73 | 85.71 |
| no-constant-condition | 123 | 48.78 | 45.53 | 55.28 | 48.78 | 54.47 |
| generator-star-spacing | 140 | 67.86 | 62.14 | 78.00 | 72.14 | 72.86 |
| no-extra-boolean-cast | 146 | 54.11 | 55.48 | 58.22 | 38.90 | 58.22 |
| no-cond-assign | 146 | 45.21 | 43.84 | 47.95 | 49.32 | 47.95 |
| no-process-exit | 152 | 32.89 | 30.26 | 38.82 | 35.53 | 37.50 |
| no-empty | 206 | 26.70 | 26.21 | 27.18 | 27.67 | 31.55 |
| no-dupe-keys | 219 | 53.42 | 53.88 | 53.51 | 57.53 | 55.25 |
| prefer-spread | 244 | 45.08 | 40.57 | 45.90 | 50.08 | 45.49 |
| no-useless-escape | 293 | 35.15 | 32.76 | 34.13 | 37.88 | 40.61 |
| no-console | 307 | 73.62 | 73.94 | 74.59 | 74.27 | 73.94 |
| guard-for-in | 324 | 41.98 | 38.89 | 45.68 | 44.75 | 45.37 |
| no-throw-literal | 408 | 72.06 | 72.06 | 73.06 | 72.30 | 74.51 |
| no-debugger | 417 | 94.48 | 95.44 | 95.44 | 95.20 | 94.24 |
| prefer-rest-params | 454 | 35.68 | 34.58 | 42.29 | 42.39 | 43.61 |
| no-unreachable | 473 | 63.85 | 63.85 | 64.48 | 66.17 | 64.69 |
| no-extra-semi | 598 | 82.61 | 83.11 | 83.11 | 84.78 | 83.61 |
| no-redeclare | 639 | 49.45 | 54.77 | 58.37 | 55.71 | 59.78 |
| comma-style | 639 | 46.48 | 49.14 | 50.39 | 52.58 | 52.11 |
| no-unused-vars | 777 | 51.87 | 55.34 | 57.79 | 54.95 | 56.11 |
| no-undef | 1,064 | 22.65 | 23.68 | 26.88 | 24.72 | 27.35 |
| no-invalid-this | 1,609 | 37.48 | 36.42 | 42.20 | 43.57 | 44.13 |
| Total | 10,465 | - | - | - | - | - |
| Average | | 49.22 | 49.58 | 53.50 | 54.21 | 53.58 |
| Weighted Average | | 49.58 | 49.96 | 53.30 | 53.46 | 54.15 |
| #Error type w/ EM>50.0 | | 23 (44%) | 27 (52%) | 33 (63%) | 31 (60%) | 30 (58%) |

Table 7: Performance (exact match) breakdown on 52 error types in original TFix benchmark and its duplicated version.

FIG. 14

| | T5-large | CodeT5-small | RAP-Gen-small | CodeT5-base | RAP-Gen-base |
|---|---|---|---|---|---|
| # Ground-truth EL Removal | 2,386 | 2,381 | 2,381 | 2,381 | 2,381 |
| # Predicted EL Removal | 1,882 | 1,922 | 1,954 | 1,925 | 1,922 |
| # Correct EL Removal | 1,811 | 1,855 | 1,881 | 1,858 | 1,866 |
| # False Positive | 71 | 67 | 73 | 67 | 56 |
| Precision (%) | 96.23 | 96.51 | 96.26 | 96.52 | 97.09 |
| Recall (%) | 75.90 | 77.91 | 79.00 | 78.03 | 78.37 |
| F1 (%) | 84.86 | 86.22 | 86.78 | 86.30 | 86.73 |

Table 8: Analysis of error line removal pattern (the fix is obtained by removing the error line from the buggy code) on TFix.

*FIG. 15*

SYSTEMS AND METHODS FOR RETRIEVAL-AUGMENTED PATCH GENERATION FOR AUTOMATIC PROGRAM REPAIR

CROSS-REFERENCE TO RELATED APPLICATION

This application the claims benefit of U.S. Provisional Application No. 63/343,264, filed May 18, 2022, which is hereby incorporated by reference in its entirety.

TECHNICAL FIELD

The embodiments relate generally to machine learning and auto-code generation, and more specifically to systems and methods for automatic program repair (APR) using retrieval-augmented patch generation (RAP-Gen).

BACKGROUND

Software developers often spend significant amount of time and energy for debugging and repairing their source code, rendering software development costly and time-consuming. Some existing automatic program repair tools may ease the difficulty and cost of program repair with use cases including search of patches at development time, build time or run time. For example, some search-based (also referred to as generate-and-validate) approach may search for repairs based on the fix patterns mined via manual heuristic rules or redundancy-based techniques. The redundancy-based techniques generally make a redundancy assumption that the fixed patch can often be found (or reconstructed) from elsewhere in the codebase (a donor code snippet). Thus, these conventional search-based techniques have limited accuracy and efficiency in repairing programs.

Therefore, there is a need for a more efficient way for automatic program repair.

BRIEF DESCRIPTION OF THE DRAWINGS

FIG. 4A is an example logic flow diagram illustrating a method of training a retrieval-augmented patch generation framework for automatic program repair as shown in FIG. 3, according to some embodiments described herein; FIG. 4B is an example logic flow diagram illustrating a method of an inference process using a trained retrieval-augmented patch generation framework, according to some embodiments described herein.

FIGS. 5-15 provide example data tables illustrating example data performance of the automatic program repair framework using retrieval-augmented patch generation described in relation to FIGS. 1-4B, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Existing automatic program repair systems may reduce manual debugging efforts and improve software reliability. Conventional search-based techniques typically rely on heuristic rules or a redundancy assumption to mine fix patterns. Some deep learning-based approaches may automate the program repair process by training learning models to generate code repair patches. However, performance of such learning models is often limited by a fixed set of parameters to model the highly complex search space of program repair.

In view of the need for efficient and accurate code repair systems, embodiments described herein provide a retrieval-augmented patch generation framework to retrieve code patches, using a patch retriever based on relevant fix patterns. Specifically, a hybrid patch retriever may be configured for fix pattern mining that accounts for both lexical and semantic matching through sparse and dense retrieval based on the raw source code. The retriever is also a language-agnostic retriever as it does not require any language-specific features such as abstract syntax trees. One improvement from previous fix pattern mining models is that the retriever utilizes the top one relevant bug-fix pair as a guiding fix pattern for each buggy patch instead of clustering various fix templates. This strategy aligns with debugging behaviors of human developers, who often search for relevant bug-fix examples to distill some repair clues for bug fixing.

In one embodiment, a pretrained Transformer-based encoder-decoder model (e.g., a CodeT5 model) may be adopted as the foundation patch generator. CodeT5 is a generic programming language model pretrained on large source code corpora using code-aware language modeling objective. A two-stage training strategy may be used to train the pretrained encoder-decoder model to connect the patch retriever and CodeT5 patch generator. The patch retriever first searches for relevant bug fix patterns and then pass them to patch generator for synthesizing a fixed patch based on both the source buggy code and the external (retrieved) bug fix knowledge. The retrieved fix pattern may then be directly appended into the source buggy patch. In this way, the retriever may be integrated with any sequence-to-sequence learning based model for retrieval in fix-pattern mining for program repair.

Figure 1:
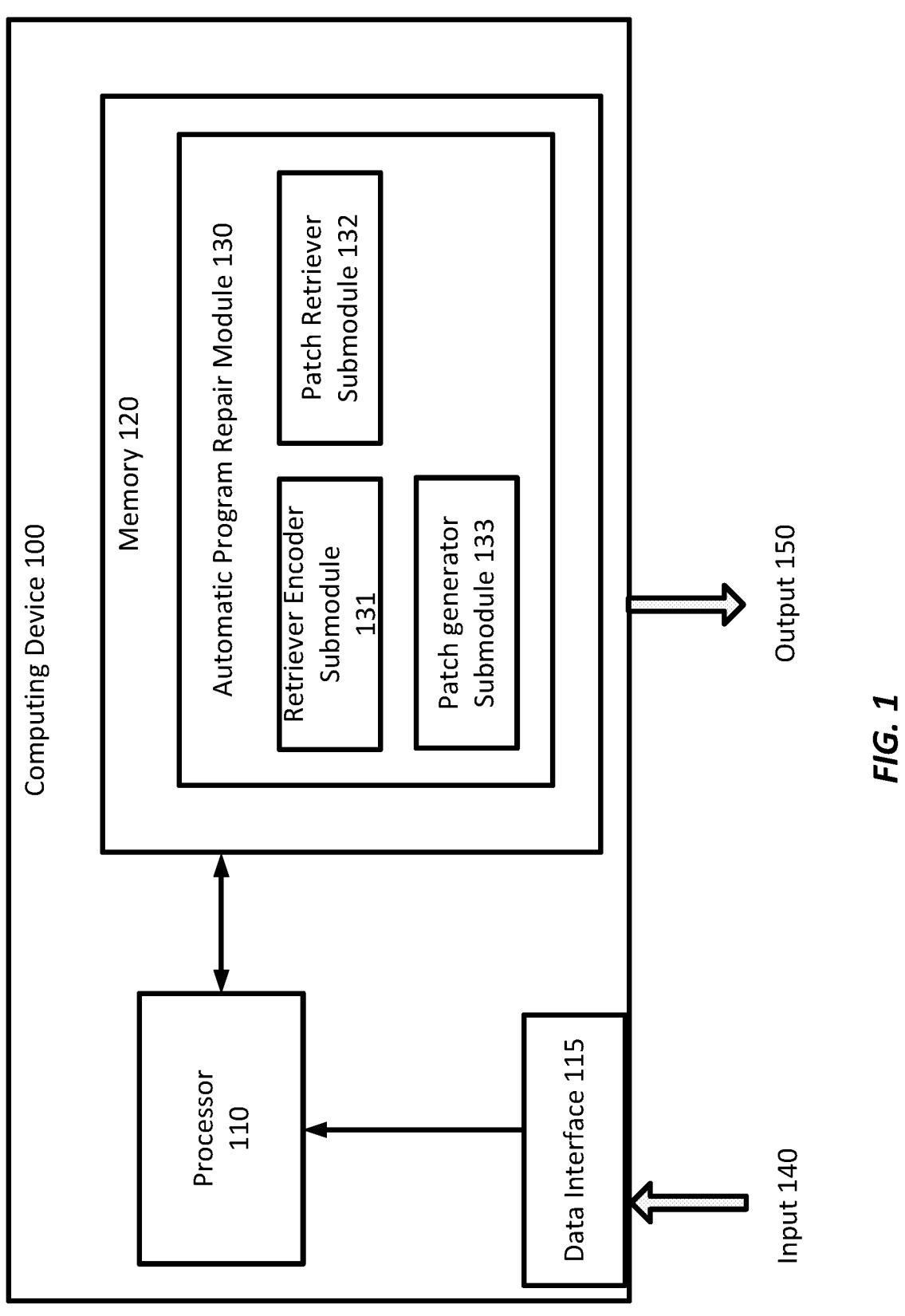
FIG. 1 is a simplified diagram of a computing device for implementing the automatic program repair framework described in FIG. 3 and other embodiments described herein.
Figure 3:
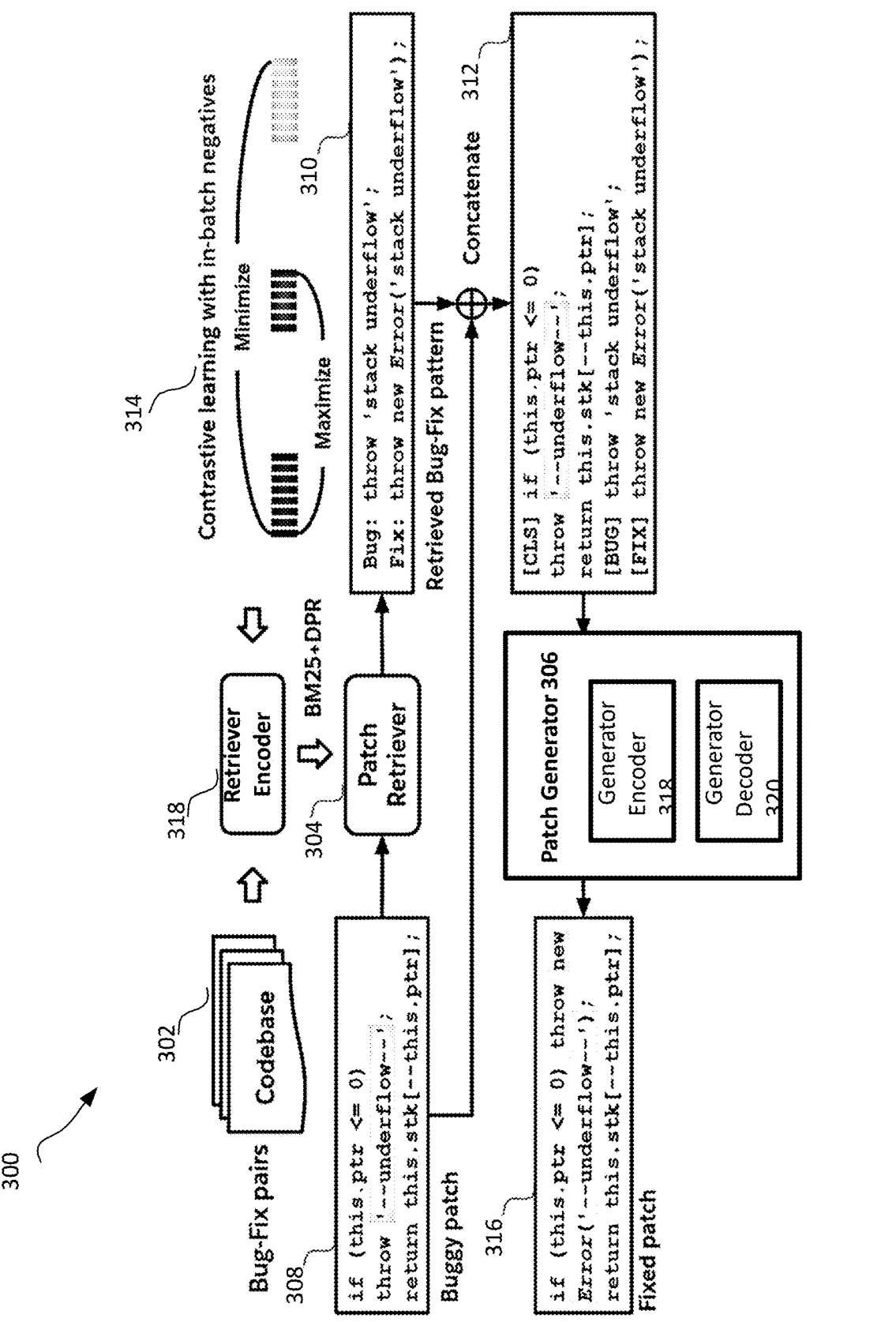
FIG. 3 is an example block diagram illustrating an example architecture for an automatic program repair framework using retrieval-augmented patch generation, according to some embodiments described herein.

FIG. 1 is a simplified diagram of a computing device 100 for implementing the automatic program repair framework shown in FIG. 3, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for the automatic program repair module 130 that may be used to implement and/or emulate the systems and models, and/or to implement any of the methods described further herein. An automatic program repair module 130 may receive input 140 that includes an input such as a program bug, and/or the like via the data interface 115. The automatic program repair module 130 may generate an output 150 such as a code patch.

In some embodiments, the automatic program repair module 130 includes the retriever encoder submodule 131, the patch retriever submodule 132, and the patch generator submodule 133. In one embodiment, the automatic program repair module 130 and its submodules 131-133 may be implemented by hardware, software and/or a combination thereof.

Some examples of computing devices, such as computing device 200 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
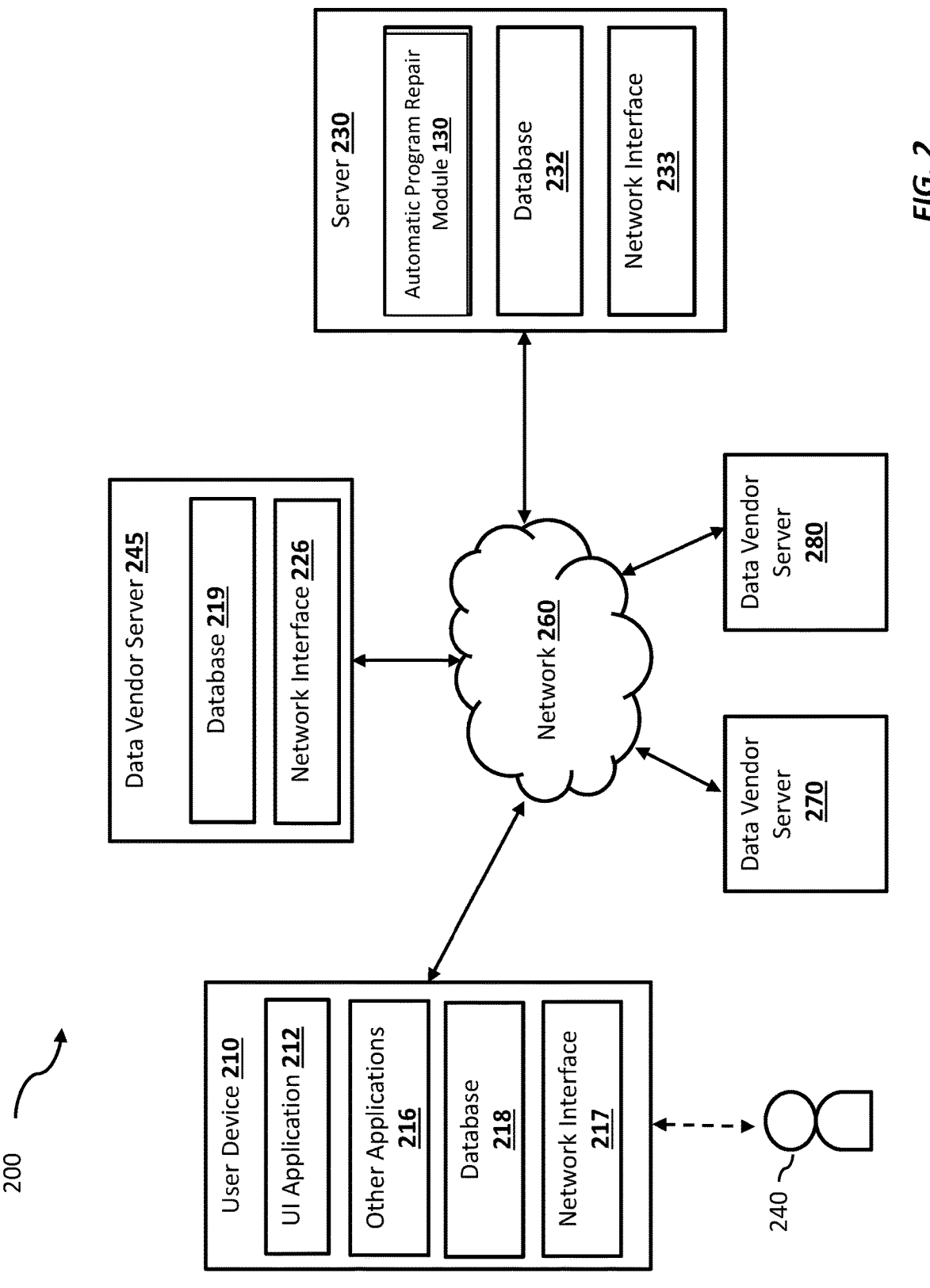
FIG. 2 is a simplified block diagram of a networked system suitable for implementing the automatic program repair framework described in FIG. 3 and other embodiments described herein.

FIG. 2 is a simplified block diagram of a networked system suitable for implementing the automatic program repair framework described in FIG. 3 and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating buggy code and/or fixed code from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the buggy code and/or fixed code.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203*a-n* (or collectively referred to as 203) to provide training datasets including pairs of buggy code and fixed code to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the automatic program repair module 130 and its submodules described in FIG. 1. In some implementations, module 130 may receive data from database 219 at the data vendor server 245 via the network 260 to generate a fixed patch of code. The generated fixed patch of code may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the automatic program repair module 130. In one implementation, the database 232 may store previously generated fixed patch of code and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

FIG. 3 is an example block diagram illustrating an example architecture for an automatic program repair framework 300 using retrieval-augmented patch generation (RAP-Gen), also referred to as RAP-Gen framework 300, according to embodiments described herein. The RAP-Gen framework 300 aims to generate the target program patch based on an input buggy patch, together with a relevant bug fix pattern via retrieval.

The task formulation of the retrieval-augmented patch generation for automatic program repair is described as follows.

$$\text{Let } D = \{(X_i Y_i)\}_{i=1}^{|D|}$$

be a program repair dataset consisting of $|D|$ bug-fix pairs $(X_i Y_i)$, where $X_i$ and $Y_i$ are i-th buggy and fixed program patch, respectively. A codebase C (e.g., codebase 302) containing a large collection of previous bug-fix pairs $$C = \{(B_j, F_j)\}_{j=1}^{|C|},$$

where $(B_j, F_j)$ denotes the j-th bug-fix pair. Given a buggy program patch $X_i$ 308 in D, a patch retriever 304 retrieves one or more most relevant bug-fix pair(s) $(B_j, F_j)$ in the codebase C based on a relevance scoring function $f_\phi(X_j, B_j)$ parameterized by $\phi$.

In some embodiments, the original input sequence $X_i$ 308 is augmented with the retrieved bug-fix pair to form a new input sequence 312, e.g., $\hat{X}_i = X_i \oplus B_j \oplus F_j$, where $\oplus$ denotes the concatenation operation. A patch generator 306 (e.g., using a sequence-to-sequence (seq2seq) generator, and also referred to as a sequence generator 306) may then generate $Y_i$ 316 from $\hat{X}_i$ 312 in an autoregressive manner. The framework 300 may learn the probability $$P_\theta\left(y_i \mid \hat{X}_i\right) = \prod_{k=1}^{n} P_\theta\left(Y_{i,k} \mid \hat{X}_i Y_{i,1} : Y_{i,k-1}\right)$$

with the patch generator 306 parameterized by θ, where $Y_{i,1} : Y_{i,k-1}$ is the previous sequence before the k-th token and n denotes the number of tokens in the target sequence $Y_i$. In some embodiments, the external codebase C 302 may be regarded as a non-parametric memory, and the retrieved bug-fix pair 310 may be regarded as a guiding fix pattern for the patch generation model 306. In probabilistic terms, the retrieval $Z_j(B_j, F_j)$ may be formulated as a latent variable, which may be approximated by top-1 in some cases. Formally, $$P(Y_i \mid X_i) = \sum_{j=1}^{|C|} \underbrace{P_\phi(Z_j \mid X_i)}_{Retriever} \underbrace{P_\phi(Y_i \mid X_i, Z_j)}_{Generator} \approx P_\phi\left(Y_i \mid X_i, Z_j^*\right),$$

where $$Z_j^*$$

is the top-1 retrieved output from the retriever $P_\phi(Z_j|X_i)$. The top-1 approximation may be adopted for improved efficiency, as marginalization over k>1 makes the training and inference complicated and inefficient. In some embodiments, top-k (e.g., k=2,3,5) with the Fréchet inception distance (FiD) method may be used.

As shown in the example of FIG. 3, RAP-Gen framework 300 includes a patch retriever 304 and a code-aware pretrained patch generator 306. The patch retriever 304 is configured to retrieve relevant fix patterns to benefit automatic program repair. It may build on a relevance scoring function $f_\phi(X_i, B_j)$ to compute the relevance between the (query) buggy patch Xi 308 and a previous (key) buggy patch $B_j$ in the codebase C 302. In various embodiments, the patch retriever 304 may include a lexical-based retriever (e.g., BM25) and/or a semantic-based retriever (e.g., Dense Passage Retrieval (DPR)). In the example of FIG. 3, the patch retriever 304 includes a neural network model (e.g., retriever encoder 318), and uses a hybrid approach to combine a lexical-based retriever (e.g., BM25) and a semantic-based retriever (e.g., DPR) to take both lexical and semantic information into account.

Lexical-based Retriever. In some embodiments, the lexical-based retriever (e.g., BM25) may be implemented using a term-based retriever, and may use sparse vector representation for lexical matching. The lexical-based retriever may convert each code patch as bag-of-words representation, and compute a lexical similarity between the query patch $X_i$ and a candidate patch $B_j$. The computed similarity score is represented as $f_\phi(X_i, B_j) = BM25(X_i, B_j)$. In an example, a sparse term-based retriever may be sensitive to the choice of identifier naming in source code that does not impact the code semantics.

Semantic-based Retriever. In some embodiments, the semantic based retriever may be implemented using Dense Passage Retriever (DPR), and may retrieve relevant patches via measuring their semantic similarity. In some embodiments, to encode the code patch, an encoder (e.g., a Transformer-based encoder) may be used to map each patch to a fixed-size dense vector. A DPR may be initialized from an encoder of a pretrained transformer-based neural network model (e.g., Code Bidirectional Encoder Representations from Transformers (CodeBERT), etc.). The encoder may be pretrained using a large code repository in one or more programming languages (e.g., GitHub code repositories in six programming languages). In an example, the final layer hidden state of a [CLS] token from the encoder is used as the patch representation. In some embodiments, a shared DPR may be used to separately encode the query patch $X_i$ 308 and a candidate patch $B_j$ in C as $CLS_{X_i}$ and $CLS_{B_j}$, respectively. Then the similarity is computed by the inner product between these two patch representations as the following:

$$f_\phi(X_i, B_j) = sim(X_i, B_j) = \left[CLS_{X_i}\right]^T \left[CLS_{B_j}\right].$$

In some embodiments, a shared DPR may be used to separately encode the query patch $X_i$ 308 and a candidate patch $F_j$ in C as $CLS_{X_i}$ and $CLS_{F_j}$, respectively. Then the similarity is computed by the inner product between these two patch representations as the following:

$$f_\phi(X_i, F_j) = sim(X_i, F_j) = \left[CLS_{X_i}\right]^T \left[CLS_{F_j}\right].$$

While the descriptions herein generally use a similarity between $X_i$ and $B_j$ (e.g., using $f_\phi(X_i, B_j)$) for retrieval, it is noted that the similarity used for retrieval may include similarity between $X_i$ and $B_j$ (e.g., using $f_\phi(X_i, B_j)$), similarity between $X_i$ and $F_j$ (e.g., using $f_\phi(X_i, F_j)$), and/or a combination thereof.

In some embodiments, the semantic based retriever (e.g., DPR) is further trained, using a training dataset including pairs of a buggy patch and a fixed patch. In an example, the codebase 302 including the bug-fix pairs may be used, by considering the buggy code $B_j$ as the query and the corresponding fixed code $F_j$ as the key. This may be performed based on the assumption that the buggy patch and its fixed patch often shares similar semantics (e.g., identifiers, data flow, and code structures). This technique may be used to avoid the massive manual annotation efforts needed to curate a bug-to-bug search dataset.

In an example where bug-fix pairs are used as query and corresponding key, contrastive learning with in-batch negatives method 314 is used for training the semantic based retriever, where in-batch negatives are used to optimize a contrastive loss (e.g., an InfoNCE contrastive loss) as the following:

$$\mathcal{L}_{infoNCE} = \frac{1}{N} \sum_{i=1}^{N} -\log \frac{\exp(sim(B_i, F_i))}{\exp(sim(B_i, F_i)) + \sum_{j \in M, j \neq i} \exp(sim(B_i, F_j))},$$

where M is the current minibatch, and N denotes the number of positive training examples in the minibatch. This objective aims to maximize the similarity between positive examples while minimizing the similarity between negative examples. Each positive example may have |M|−1 negative samples. It is noted that various contrastive learning techniques, e.g., in-batch negatives strategy, hard negative mining strategy, etc. may be used, while in some embodiments, the contrastive learning with in-batch negatives as described above provides better performance than the hard negative mining strategy for noisier training data.

In some embodiments, at the inference stage, given a query buggy patch $X_i$ 308, the semantic-based retriever (e.g., DPR) retrieves a relevant bug-fix pair $(B_j, F_j)$ by computing the similarity between $X_i$ (query) and $B_j$ (key). In some embodiments, the semantic-based retriever may retrieve a relevant bug-fix pair based on the similarity between $X_i$ and $F_j$, and/or a combination with the similarity between $X_i$ (query) and $B_j$ (key).

Hybrid Retriever. As shown in the example of FIG. 3, in some embodiments, to take both lexical and semantic information into account, a hybrid approach is utilized to combine the lexical retriever (e.g., BM25) and the semantic retriever (e.g., DPR). For example, the similarity score may be computed as $f_\phi(X_i, B_j)=\text{sim}(X_i, B_j)+\lambda \text{BM25}(X_i, B_j)$, where function A is a weight to balance the two retrievers, and may be empirically set to 1. The hybrid retriever is more robust compared to retrievers that rely only on either lexical or semantic information.

In the example of FIG. 3, RAP-Gen framework 300 includes a patch generator 306 for generating the fixed code patch. In some embodiments, an augmented buggy code patch 312 is generated, by a code-aware pretrained patch generator 306, using the input buggy patch 308 (denoted as $X_i$), also referred to as source buggy patch 308 or query buggy patch 308, and the retrieved bug-fix pattern 310 (denoted as $B_j$, $F_j$), e.g., using concatenation as follows: $\hat{X}_i = X_i \oplus B_j \oplus F_j$. A patch generator 306 is built to generate the fixed code patch $Y_i$ 316 (e.g., with a seq2seq model). The patch generator 306 in RAP-Gen framework 300 may include any suitable neural network models for sequence generation (also referred to as sequence generation model or sequence generator). In some embodiments, the patch generator 306 includes a sequence generator optimized on natural language implementations.

In some embodiments, a patch generator 306 includes a code-aware programming language model pretrained on a large-scale source code corpora. In an example, the sequence generator uses CodeT5, which is a unified pretrained Transformer-based encoder-decoder model that achieves state of art (SoTA) results in multiple code intelligence tasks such as defect detection and code refinement. It may be pretrained on 8.3 million functions in 8 different programming languages (including JavaScript and Java) collected from GitHub. CodeT5 may employ identifier-aware pretraining objectives to incorporate the code-specific knowledge into the language model. It may provide a code-specific Byte-Pair Encoding (BPE) tokenizer optimized for code, and may be able to avoid Out-of-Vocabulary (OoV) problems. CodeT5 may be used in the patch generator 306, which may provide powerful code understanding capability.

As shown in the example of FIG. 3, the retrieval-augmented input 312 to patch generator 306 (e.g., CodeT5) may be prepared as $\hat{X}_i=[\text{CLS}]X_i[\text{BUG}]B_j[\text{FIX}]F_j$, where [BUG] and [FIX] are special tokens to separate the retrieved bug-fix pair with the source buggy patch 308. The patch generator 306 (e.g., CodeT5) may include an encoder 318 to take $\hat{X}_i$ 312 as input, and a decoder 320 to synthesize and generate the fixed patch $Y_i$ 316. In some embodiments, during training of the patch generator 306, a teacher forcing algorithm may be used to minimize the language modeling loss. In some embodiments, during inference using the trained patch generator, a beam search (e.g., size of 5) is used to generate a ranking list of candidate fixed patches.

In various embodiments, the RAP-Gen framework 300 leverages the general code understanding knowledge encoded via pretraining on a large-scale code corpus (e.g., using CodeT5). For example, the source input sequence 312 may be generated by concatenating the original buggy code patch 308 and the top ranked bug-fix pair 310 from patch retrievers 304. In some embodiments, the augmented source input buggy patch 312 may be generated by concatenating the top-k (e.g., k=2,3,5) retrieved bug-fix pairs to the input buggy patch 308.

FIG. 4A is an example logic flow diagram illustrating a method of training the retrieval-augmented patch generation framework for automatic program repair as shown in FIG. 3, according to some embodiments described herein. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the automatic program repair module 130 (e.g., FIG. 1) for performing automatic program repair using retrieval-augmented patch generation.

At step 402, a patch retriever including a retriever encoder is provided. In the example of FIG. 3, in the retrieval-augmented patch generation framework 300, a patch retriever 304 including a retriever encoder 318 is provided. In some embodiments, as shown at step 404, the retriever encoder 318 is pretrained, e.g., using a first training dataset including large programing language corpora (e.g., GitHub code repositories in one or more programming languages or other suitable code repositories).

At step 406, a patch generator including a sequence generator neural network model is provided. In the example of FIG. 3, in the retrieval-augmented patch generation framework 300, a patch generator 306 includes a sequence generator neural network model, specifically, a Transformer-based encoder-decoder model including a generator encoder 318 and a generator decoder 320. In some embodiments, as shown at step 404, the patch generator 306 is pretrained, e.g., using a second training dataset including large programing language corpora (e.g., GitHub code repositories in one or more programming languages or other suitable code repositories).

At step 410, a RAP-Gen framework (e.g., RAP-Gen framework of FIG. 3) including the patch retriever and the patch generator may be trained, e.g., using a two-stage training process. The two-stage training process includes step 412, at which a first stage training is performed by training the patch retriever using a third training dataset. In some embodiments, the third training dataset may use the bug-fix pairs in codebase 302. For example, when using third training dataset for training a semantic retriever of the patch retriever 304, the buggy code Bj of a bug-fix pair in the codebase may be considered as the query and the corresponding fixed code Fj may be considered as the key. In another example, the fixed code Fj of a bug-fix pair in the codebase may be considered as the query and the corresponding buggy code Bj may be considered as the key. This is based on the assumption that the buggy patch and its fixed patch often shares similar semantics (e.g., identifiers, data flow, and code structures). By using the bug-fix pairs in codebase 302 for the third training dataset, massive manual annotation efforts needed to curate a bug-to-bug search dataset as the third training dataset may be avoided. In an example, the first stage training may use constative learning algorithm by optimizing a contrastive loss.

The two-stage training process includes step 414, at which a second stage training is performed by training the patch generator using a fourth training dataset, using the patch retriever trained by the first stage training. In an example, a teacher forcing algorithm is used to minimize the language modeling loss, when input to the patch generator is generated using an original input buggy code patch and the top ranked bug-fix pair from the trained patch retriever.

During the second stage training, in an example where the fourth training set is generated from the bug-fix pair code-base, the patch retriever (already trained using the first stage training) is not allowed to access the ground-truth bug-fix pair, otherwise the training loss would easily drop close to zero as the patch generator may directly copy the retrieved fix as the target output. In that example, each sample of the fourth training set is a buggy patch of a corresponding bug-fix pair (also referred to as the ground-truth bug-fix pair) from the codebase, and the corresponding ground-truth is the fixed patch of the corresponding bug-fix pair. For each sample buggy patch input, another bug-fix pair (not the ground-truth one) is retrieved by the patch retriever from the codebase. The retrieved bug-fix pair is appended to the buggy patch input to generate an augmented sequence input for the patch generator. Note that the requirement of no access to ground-truth bug-fix pair only applies to the second stage of training when the codebase is used to provide the fourth training set, and does not apply to the first stage of training the patch retriever when the codebase is used to provide the third training set.

How the third and fourth datasets are generated? Recall that we have bug-fix pairs for each downstream dataset, which are exactly the third training set.

Referring to FIG. 4B, illustrated therein is an example logic flow diagram illustrating a method 450 of an inference process using the trained retrieval-augmented patch genera-tion framework, according to some embodiments described herein. One or more of the processes of method 450 may be implemented, at least in part, in the form of executable code stored on non-transitory, tangible, machine-readable media that when run by one or more processors may cause the one or more processors to perform one or more of the processes. In some embodiments, method 450 corresponds to the operation of the automatic program repair module 130 (e.g., FIG. 1) for performing automatic program repair using retrieval-augmented patch generation.

At step 452, a first buggy patch is received by the trained retrieval-augmented patch generation framework. In the example of FIG. 3, a trained retrieval-augmented patch generation framework 300 receives a first buggy patch 308, and provides it to an input of its trained patch retriever 304.

At step 454, one or more bug-fix pairs are provided based on the first buggy patch. In the example of FIG. 3, the trained patch retriever 304 receives the first buggy patch 308, and retrieves one or more bug-fix pairs from codebase 302, e.g., based on the similarity of between the first buggy patch 308 and the bug-fix pairs. In various embodiments, the similarity is determined based on a similarity between the first buggy patch 308 and the buggy patch of the bug-fix pair, a similarity between the first buggy patch 308 and the fixed patch of the bug-fix pair, or a combination thereof. The similarity may include a lexical similarity, a semantic simi-larity, or a combination thereof.

At step 456, a first augmented buggy patch is generated based on the first buggy patch and the retrieved one or more bug-fix pairs. In the example of FIG. 3, a first augmented buggy patch 312 is generated, using the first buggy patch 308 and the one or more bug-fix pairs 310 provided by the patch retriever 304. The first augmented buggy patch 312 is provided to patch generator 306.

At step 458, a first fixed patch for the first buggy patch is generated using the first augmented buggy patch. In the example of FIG. 3, patch generator 306 receives the first augmented buggy patch 312, and generates a first fixed patch 316 based on the first augmented buggy patch 312.

Example Data Experiments and Performance

Referring to FIG. 5, in some experiments, the RAP-Gen framework is evaluated on two popular APR datasets, namely TFix (Berkay Berabi, Jingxuan He, Veselin Ray-chev, and Martin T. Vechev, TFix: Learning to Fix Coding Errors with a Text-to-Text Transformer, Proceedings of Machine Learning Research (PMLR), Vol. 139, 780-791) in JavaScript and Code Refinement (Michele Tufano, Cody Watson, Gabriele Bavota, Massimiliano Di Penta, Martin White, and Denys Poshyvanyk, An Empirical Study on Learning Bug-Fixing Patches in the Wild via Neural Machine Translation, ACM Trans. Softw. Eng. Methodol. 28, 4 (2019), 19:1-19:29) in Java language. Both datasets are originally collected from GitHub commits but with a major difference that bug-fix pairs in TFix may be validated by a static analyzer, while pairs in Code Refinement are verified via checking if the commit message contains keywords like "fix bug." The data statistics of TFix and Code Refinement benchmarks are shown in Table 1 of FIG. 5.

TFix. Specifically, TFix is a large-scale program repair dataset comprising JavaScript code patch pairs curated from 5.5 million GitHub commits. It comprehensively covers 52 unique error types detected by a static analyzer ESLint. In addition to error types, it provides rich error annotations such as error message and localized error line so that there is no need for fault localization like prior work. In TFix, they approach the APR task as a text-to-text generation problem with T5-large. In the source input sequence, they combine all error information together with the buggy code patch into a single piece of text:

fix {error type} {error message} {error context} where error context consists of the given localized error line, and its two neighboring code lines are used to form a buggy code patch. The target sequence is to replace the error line with a fixed line in the error context. The same data format is adopted in the experiments, and data examples may be found in the source input of FIG. 6 (illustrating one bug fix example on TFix test set, where the RAP-Gen framework correctly fixes the bug).

During data processing, a duplication issue inside data splits and between data splits is observed. Specifically, there are 114, 2, and 4 duplicates in the train, validation, and test split respectively. For inter-split duplicates, there are 28, 34, and 4 duplicates between train and test, train and test, validation and test splits respectively. Those duplicates (243) are filtered, and a deduplicated version TFix (Dedup) is shown in Table 1 of FIG. 5.

Code Refinement. Tufano et al. released two code refine-ment datasets containing bug-fix pairs at function level, which are collected from public GitHub Archive (https://www.gharchive.org/) between Mar.2011 and Oct. 2017. They use Google BigQuery APIs to identify all Java com-mits having a message containing the patterns: ("fix" or "solve") and ("bug" or "issue" or "problem" or "error") to ensure the quality of the collected bug-fix function pairs. They normalized the functions via obfuscating identifiers with indexed tokens such as TYPE1, VAR1, METHOD1, etc. One data example can be found in FIG. 7 (illustrating one bug fix example on Refinement Small test set, where the RAP-Gen framework gives a correct prediction). The two data subsets are determined by the number of tokens, i.e., #of code tokens <=50 for the small set and 50<#of code tokens <=100 for the medium set.

In some embodiments, the RAP-Gen framework 300 may be fine-tuned (e.g., for 30 epochs) with a sequence-to-sequence generation loss for each benchmark, e.g., using an AdamW optimizer (Ilya Loshchilov and Frank Hutter DecoupledWeight Decay Regularization, ICLR, 2019). Grid search may be conducted for hyper-parameter tuning, with various batch sizes (e.g., 16, 32, 64) and learning rates (e.g., 1e-4, 5e-5, 2e-5). For example, a batch size of 64 with a learning rate of 1e-4 may be used for TFix, and a batch size of 32 with a learning rate of 5e-5 for Code Refinement. In an example, the training time of RAP-Gen-base on each benchmark with one A100 GPU is within 2 days. During inference, beam search may be employed with a beam size of five to produce a ranked list of synthesized fixed patches.

In some embodiments, bug-fix pairs in the training set are adopted as a search codebase to build the patch retriever 304. For lexical-based retrievers, an example open-sourced Python library (e.g., https://pypi.org/project/rank-bm25 of BM25) may be used. As a sparse term-based retriever, the choice of tokenizer would largely affect the retrieval performance. In an experiment, the CodeT5 tokenizer, from which is a code specific BPE tokenizer optimized for code tokenization, is adopted. A BM25 search engine on benchmarks TFix and Code Refinement is applied on a machine of 95 CPUs with 600G memory. Each experiment is finished within one hour with multi-processing.

In the experiment, for semantic-based retrievers, the DPR initialized CodeBERT is used to encode each patch into dense vectors for semantic matching. Separately, a DPR model is fine-tuned on each benchmark for 50 epochs using the InfoNCE contrastive loss. A batch size of 64 and a learning rate of 2e-5 is used to fine-tune on one A100 GPU with 40G memory. The training time for TFix and Code Refinement are around 9 and 5 GPU hours respectively.

For hybrid retrievers, the ranking scores of BM25 and DPR are calculated, and these normalized scores are linearly combined with equal weights to build a hybrid retriever, namely "Hybrid". For all retrievers, the CodeT5 tokenizer is used to encode the patch with a maximum sequence length of 256.

Evaluation Metrics. For evaluation metrics, the smoothed BLEU-4 (Chin-Yew Lin and Franz Josef Och, ORANGE: a Method for Evaluating Automatic Evaluation Metrics for Machine Translation, COLING, 2004) scores and Exact Match (EM) accuracy are used to evaluate program repair performance (e.g., following Yue Wang, Weishi Wang, Shafiq R. Joty, and Steven C. H. Hoi, CodeT5:Identifier-aware Unified Pre-trained Encoder-Decoder Models for Code Understanding and Generation, EMNLP, Association for Computational Linguistics, 8696-8708). BLEU-4 is a looser metric to evaluate the degree of sub-word overlapping, while EM is a stricter metric requiring the prediction is identical to the ground-truth patch in a real commit. As a buggy program might have different ways to repair, Error Removal metric (e.g., as used in TFix) is used to take various forms of fixes into account. The prediction is counted as correct for Error Removal if the existing error is removed and no new error is introduced after the fix. For all metrics, results are presented in a scale of 0-100(%), and a higher score represents a better performance.

Baseline Models. The RAP-Gen framework is compared with learning based models in two program repair benchmarks. CoCoNuT is a context-aware neural machine translation framework based on convolutional encoder-decoder model. SequenceR is an LSTM-based sequence-to-sequence generation model with copy mechanism. In addition, the RAP-Gen framework is compared with pretrained programming language models based on Transformer architecture. One group of these models is the encoder-only models such as RoBERTa (code), CodeBERT, and GraphCodeBERT. These encoder-only models require a randomly initialized decoder for program repair tasks.

Furthermore, the RAP-Gen framework is compared with encoder-decoder Transformer models. PLBART is a unified pretrained model with denoising objectives including token masking, token deletion, and token infilling. TFix is initialized with T5-large checkpoints and continue to fine-tune on TFix dataset. CoTexT is another T5-based models pretrained on both text and code. NSEdit is a language model with encoder and decoder initialized from CodeBERT and CodeGPT respectively. It is fine-tuned to generate the fix via a neural-symbolic editing sequence and ranks as the current SoTA model on the Code Refinement benchmark. Results from all baseline models are obtained from their original paper.

The experiments validate that the retrieval-augmented patch generation is an effective approach for program repair. Comprehensive experiments were conducted to compare the RAP-Gen with prior learning-based methods on two benchmarks. First, CodeT5 models are evaluated on TFix, and its evaluation is improved by providing a deduplicated version of dataset and a more reasonable metric, and by additionally introducing a looser metric of BLEU-4 score which is aligned with exact match. Results show that CodeT5-base establishes a new SoTA performance on this task, improving T5-large's 49.70 to 53.57 in EM and 76.98 to 78.85 in BLEU-4. Further, RAP-Gen models are evaluated using both TFix and Code Refinement datasets. It is observed that RAP-Gen with lexical and semantic-based retrievers significantly boost the performance. Specifically, RAP-Gen-base with "Hybrid" improves the exact match over the best performing baseline (49.70→54.15) in TFix, while RAP-Gen-base with "Hybrid" boosts the exact match (24.04→24.80) in the small set and (14.18→15.84) in the medium set of the Code Refinement benchmark. All these results validate that retrieval-augmented patch generation (RAP-Gen) is an effective approach for APR.

The experiments illustrate that retrieval-augmented patch generation with CodeT5 is an effective approach for program repair. First, CodeT5 is compared with traditional APR techniques on TFix benchmark, improved with a deduplicated version of the data and a more appropriate evaluation metric. Then RAP-Gen framework integrated with two sizes of CodeT5 is evaluated on TFix and Code Refinement benchmarks. Further, the experiments illustrate that the patch retriever finds relevant patches in terms of lexical and semantic similarity. In addition, case studies are provided to illustrate how retrieved bug fix patterns help in program repair. In addition, as shown by the experiments, the RAP-Gen framework provides improved performance for various error types and fix patterns. Detailed performance breakdown for 52 error types are listed, and types of error that do not benefit from the retrieval-augmentation in RAP-Gen are examined. Furthermore, how models perform with one trivial but dominating fix pattern of error line removal that simply removes the error line from the buggy code is studied.

Experiments illustrate that retrieval-augmented patch generation with CodeT5 is an effective approach for program repair. First, it provides improved TFix evaluation. The original TFix benchmark employs the direct average of exact match (EM) accuracy across 52 error types as the main evaluation metric. However, as shown in Table 7 of FIG. 14, these error types have a rather imbalanced distribution, e.g., the major error type "no-invalid-this" has 16,217 instances while the least error type "no-new-symbol" has only 10 instances. As such, in some embodiments, the weighted average is employed to take the error type distribution into account. Besides, after inspecting the released code of how TFix calculates the exact match, another limitation is that if the predicted fix contains one more whitespace such as a space or new line than the ground-truth fix, it would be regarded as a wrong exact match. However, in JavaScript language, extra whitespaces do not impact the correctness of the program. Therefore, a better metric of weighted average of EM w/o spaces is proposed, which normalizes the whitespaces before computing the EM to exclude the effects of the mismatch in multiple whitespaces. As there is a duplication issue in the TFix dataset, results on its deduplicated version are also included. Apart from exact match accuracy, a looser metric of BLEU-4 score is used to measure the subsequence overlap between the predicted fix and its ground-truth one. Note that BLEU-4 score is also computed after the whitespace normalization.

As shown in Table 2 of FIG. 9, CodeT5 models are compared with other learning-based baselines on TFix. One main observation is that for the original average EM w/spaces metric, CodeT5-base (50.88) also yields a better accuracy than T5-large (49.33), given that it has much larger model size (~3.5× of CodeT5-base). Further, focusing on a more reasonable direct average EM w/o spaces, CodeT5-base significantly boosts the performance, with around 5 absolute accuracy improvement (49.35→54.30) over T5-large. Based on the weighted average EM w/o spaces, both CodeT5-small (50.31) and CodeT5-base (53.57) outperform all the baselines including T5-large (49.70). This shows CodeT5 models with code aware pretraining on large-scale code corpora have a better understanding of program. For TFix evaluation, EM is used to denote the weighted average EM w/o spaces unless specified. For the BLEU-4 metric, it has a good alignment with the exact match metric, where CodeT5-base also gives a state-of-the-art (SoTA) performance of 78.85 on the original TFix.

Next ablation study observation is described. On the deduplicated TFix dataset, the performance across various metrics consistently drops a little bit. This is an expected phenomenon as duplications (34 instances) between the train and test splits in the original data would lead to a data leakage issue and improperly increase the performance. If the error information including error type and error message is removed, both CodeT5-small and CodeT5-base models witness a consistent performance downgrade, revealing that it is helpful to inform which types of error they need to fix for program repair models.

Referring to Table 3 of FIG. 10, RAP-Gen evaluation on TFix is described. Table 3 illustrates the results of the RAP-Gen framework on the deduplicated version of the TFix benchmark. First, a Random baseline is established via randomly retrieving bug-fix pairs from the codebase. The performance downgrades of both small and base RAP-Gen with random retrieval imply that randomly retrieved fix patterns cannot provide useful guiding signals for program repair. Then, RAP-Gen integrated with different retrievers are compared, including using a lexical-based retriever BM25, a semantic-based retriever DPR based on dense vector matching, and two ensembling methods to combine them. Results show that all retrieval-augmented approaches significantly improve the performance on both exact match and BLEU-4 for both small and base models. This indicates retrieval-augmented generation is a viable and effective approach for APR and both semantic information and lexical information are crucial to retrieve relevant fix patterns. For the ensembling methods, the RAP-Gen-base with "Hybrid" yields the best improvement over T5-large (49.58→54.15 EM). It validates that the ensembling approaches considering both lexical and semantic information may combine the best of two worlds. Another observation is that the performance gain with retrieval-augmentation is larger on RAP-Gen-small than RAP-Gen-base, implying the improvement tends to reach a saturation point with the increase of model size. RAP-Gen-small and RAP-Gen-base both use the RAP-Gen framework, with different patch generator backbones, specifically, CodeT5-base and CodeT5-small respectively with different model sizes.

In some embodiments, there can be multiple ways to fix a bug. As such, exact match with one ground-truth patch would be a too strict metric to consider other forms of correct fixes. To deal with this, a looser evaluation with error removal metric following TFix is used. Under this metric, a fixed patch is regarded as correct as long as it resolves the errors in source buggy patch and does not bring new errors (detected by the static analyzer ESLint). When it is tried to reproduce this metric on 10,465 test instances, there are two difficulties: (1) Applying ESLint requires the full file contexts for each code patch, but we found 95 code files are no longer available to retrieve. (2) There are parser errors when applying ESLint with the released configuration (https:// github.com/eth-sri/TFix) on some of data samples. As a result, a filtered subset of 6,793 instances is curated by excluding those unavailable code files and samples with parser errors, where it is also spotted that generated fixes from TFix tends to have more parser errors. Referring to Table 4 of FIG. 11, the error removal comparison is illustrated. It is observed that RAP-Gen-small model outperforms T5-large model by a good margin in error removal, implying that the RAP-Gen models are more capable of synthesizing different forms of good fixes. Besides, it is observed that there is a misalignment between error removal and exact match metrics where RAP-Gen-small gives a lower exact match but higher error removal accuracy. Such a misalignment is also observed in TFix.

Referring to Table 5 of FIG. 12, Code Refinement results and comparison with previously discussed methods are illustrated. All baseline results (including CodeT5 models) are directly obtained from their original papers. It is observed that "Naive Copy" gives a pretty high BLEU-4 score but with a zero exact match (EM), indicating the buggy code and its fix has a large overlap and exact match should be employed as the primary evaluation metric. Among the baselines, NSEdit is a very competitive one with a best result (24.04 EM) on the small subset and CodeT5-base with multi-task training gives the best result (14.18 EM) on the medium set.

From the RAP-Gen model comparison, it is observed that RAP-Gen with various retrievers consistently boost the performance over their CodeT5 counterparts. The best model establishes new SoTA results on two subsets (24.80 EM for small and 15.84 EM for medium), especially surpassing the NSEdit for around 2 absolute points on the more challenging medium set. This again confirms that retrieved fix patterns provide helpful signals to guide the program repair. Among various retrievers, DPR gives better results than BM25 for both RAP-Gen-small and RAP-Gen-base, revealing that semantic information might play a more important role than semantic information for this benchmark. Besides, "Hybrid" outperforms BM25 and DPR, implying the hybrid ensembling method is a more robust retriever to balance both semantic and semantic information for this benchmark.

In summary, comprehensive experiments are performed to compare RAP-Gen with prior learning-based methods on two benchmarks. First evaluate CodeT5 models on TFix and improve its evaluation via providing a deduplicated version of dataset and a more reasonable metric, and additionally introducing a looser metric of BLEU-4 score which is aligned with exact match. Results show that CodeT5-base establishes a new SoTA performance on this task, improving T5-large's 49.70 to 53.57 in EM and 76.98 to 78.85 in BLEU-4. We then evaluate RAP-Gen models both TFix and Code Refinement datasets and observe that RAP-Gen with lexical and semantic-based retrievers significantly boost the performance. Specifically, RAP-Gen-base with "Hybrid" improves the exact match over the best performing baseline (49.70→54.15) in TFix, while RAP-Gen-base with "Hybrid" boosts the exact match (24.04→24.80) in the small set and (14.18→15.84) in the medium set of the Code Refinement benchmark. All these results validate that retrieval-augmented patch generation with CodeT5 (RAP-Gen) is an effective approach for APR.

Next, experiments are performed to assess whether the patch retriever is able to find relevant fix patterns to benefit program repair. First, an automatic evaluation to measure the relevance in terms of lexical and semantic similarity between the query and retrieved patches is provided. Further, specific cases are provided to understand how the retrieved fix patterns contribute to better APR.

Referring to Table 6 of FIG. 13, evaluation of retrievers is illustrated. Retrievers are analyzed in terms of lexical and semantic matching between the query and the top retrieved patches. The BLEU-4 score is used to measure their subtoken overlap for lexical matching, while for semantic matching, the cosine similarity (CosSim) between their dense vectors encoded by the fine-tuned DPR retriever is used. Table 6 of FIG. 13 shows the performance of the patch retrievers on both TFix and Code Refinement benchmarks. The first row indicates the lower-bound performance via randomly retrieving bug-fix pairs from the codebase, where it is observed that this Random baseline achieves much lower scores in both lexical and semantical matching. For lexical matching, BM25 outperforms DPR on TFix but underperforms on two Code Refinement subsets, which may be caused by the data difference between TFix and Code. Refinement, where the latter employs obfuscated identifiers (e.g., VAR1, VAR2, . . . ) that hinders the performance of the lexical-based BM25 retriever. The hybrid retriever achieves the best lexical matching on all datasets, revealing the semantic information can complement to the lexical matching.

For semantic matching, DPR achieves the best results on all datasets, which is not surprising as it is optimized towards the identical objective. Notably, the hybrid retriever achieves slightly lower results than DPR but much better results than BM25, implying it may balance both lexical and semantic information and be more robust than the lexical-based retrievers, which are sensitive to the choices of identifier naming.

Referring back to FIGS. 6 and 7, case studies are used to illustrate how retrieved fix patterns help in program repair, including case studies on TFix (FIG. 6) and Code Refinement (FIG. 7), where the RAP-Gen model with retrieval-augmentation predicts a correct fix while the CodeT5 without retrieval-augmentation fails to do so. As shown in FIG.

6, the retrieved bug fix pattern is precisely the one that is required for repairing the source buggy code. Without retrieval-augmentation, CodeT5 wrongly removes the ".classify( )" from the buggy line probably via learning from the previous neighbouring line. For the Code Refinement case in FIG. 7, the retrieved bug-fix pair provides sufficient information to guide RAP-Gen model to fix the source buggy code. Without retrieval-augmentation, CodeT5 performs an incorrect repair by simply removing the last line of code.

As such, both quantitative (Table 6 of FIG. 13) and qualitative (FIGS. 6 and 7) results to assess the performance of the patch retrievers and corresponding automatic program repair systems. Results show that the hybrid patch retriever is more robust and capable of finding lexically and semantically relevant patches to aid program repair systems.

Referring to FIG. 8 and Table 7 of FIG. 15, performance of RAP-Gen for various error types and fix patterns is described. First, regarding its performance breakdown on different error types, detailed program repair performance breakdown on the deduplicated TFix dataset is listed in Table 7 of FIG. 15. CodeT5-base outperforms the previous SoTA T5-large in 44/52 error types. Especially for the major error type "no-invalid-this", CodeT5-base improves its exact match from T5-large's 37.48 to 43.57, corresponding to repair more 98 instances. While T5-large can repair at least 50% bugs for 44% of 52 error types, CodeT5-base significantly increases this percentage to 60% and RAP-Gen-small further boosts to 63%. In total, RAP-Gen-base correctly repairs more 478 buggy programs than T5-large with a much smaller model size.

Further, the effects of retrieval-augmentation in RAP-Gen compared to CodeT5 models for various error types are analyzed. As shown in Table 7 of FIG. 14, it is observed that the retrieval-augmentation technique has different effects on various error types, and sometimes even hurt the program repair performance for a certain error type subset. Specifically, in the experiments, it downgrades the APR performance for 10 error types for CodeT5-small and 18 error types for CodeT5-base. Based on the number of exact match fixes, it is observed that the largest performance downgrade of RAP-Gen-small is from the error type "no-extra-semi" (497→490), and the one of RAP-Gen-base is from the error type "no-console" (228→220).

To explore why retrieval-augmentation sometimes hinders the exact match performance in RAP-Gen models, a case study for the "no-console" error type is provide in FIG. 8. In this case, the ground-truth fix is to directly remove the error line in the buggy patch, while the RAP-Gen model repairs it into a different form based on the retrieved fix patterns that is counted as a wrong prediction in terms of exact match. This again confirms the limitations of the exact match metric to evaluate the program repair systems.

Next, it is analyzed what fix patterns are performed by the models using the TFix benchmark. After manually inspecting the bug-fix pairs, it is observed that a large proportion of fix consists of deletion operations compared to the code insertion and replacement operations. The bug fix operations consist of code insertion (12.5%), replacement (8.1%), deletion (47.9%), insertion and replacement (6.9%), insertion and deletion (8.2%), replacement and deletion (7.2%), and all three manners (9.2%). Earlier studies also reflect that the deletion operation is one of the most common fix patterns. Among the deletion operations, one dominating bug fix pattern is error line removal, which is to simply remove the error line from the buggy code (such as the example shown in FIG. 8). This trivial fix pattern accounts for around 23% in the deduplicated TFix test set. To further analyze this pattern, it is compared how different models perform using the error line removal pattern and present the results in Table 8. We observe that with the retrieval-augmentation, RAP-Gen-base achieves a lowest false positive count of 56 (corresponding to the highest precision of 97.09) compared to CodeT5-base's 67 and T5-large's 71. This indicates that RAP-Gen is able to learn more diverse bug fix patterns instead of over relying on the trivial error line removal pattern. Besides, RAP-Gen-small achieves the best recall and F1 scores but at a cost of producing more false positive predictions.

In summary, the difficulty of program repair varies from error type to error type. The best RAP-Gen-base in experiments may repair more 456 buggy programs than the best performing baseline T5-large. An error analysis is conducted to analyze why retrieval-augmentation sometimes downgrades the performance and a case study is provided to illustrate that it might be due to the limitations of the exact match metric. Moreover, one high-frequent fix pattern of error line removal is investigated to show that RAP-Gen-base gives the best precision score and RAP-Gen-small achieves the best recall and F1 scores in dealing with this pattern.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for automatic program repair, the method comprising:
   receiving a code retriever including a retriever encoder pre-trained using a first training dataset;

receiving a patch generator including a sequence generator neural network model pre-trained using a second training dataset;
   training the code retriever and the patch generator using a multi-stage training process,
      wherein a first stage training is performed by training the code retriever using a third training dataset with access to ground-truth bug-fix code pairs;
      wherein a second stage training is performed by training the patch generator using a fourth training data set without access to the ground-truth bug-fix code pairs;
   receiving a first source input buggy code; and
      wherein a third stage training is performed by training the code retriever using a fifth training data set including pairs of a bug code and a fix code by considering the bug code as a query and the corresponding fix code as a key;
   generating, using a retriever encoder of the code retriever, a first representation of the first source input buggy code;
   retrieving, using the code retriever based on the first representation, a first bug-fix code pair from a first plurality of bug-fix code pairs,
   generating a first augmented source input buggy code based on the first source input buggy code and the first bug-fix code pair by concatenating the first bug-fix code pair with the first source input buggy code; and
   generating, via the patch generator, a fixed code patch based on the first augmented source input buggy code.

2. The method of claim 1, wherein the code retriever is configured to perform retrieval based on at least one of a lexical similarity and a semantical similarity with the first source input buggy code.

3. The method of claim 2, wherein the code retriever is configured to perform retrieval based on a combination of lexical similarity and semantical similarity with the first source input buggy code.

4. The method of claim 1, wherein the patch generator includes a Transformer-based neural network model for sequence generation.

5. The method of claim 1, wherein the first bug-fix code pair of the first augmented source input buggy code is used as a guiding fix pattern for the patch generator, and
   wherein the first bug-fix code pair is used for training a semantic-based retriever of the code retriever.

6. A non-transitory machine-readable medium comprising a plurality of machine-readable instructions which, when executed by one or more processors, are adapted to cause the one or more processors to perform a method comprising:
   receiving a code retriever including a retriever encoder pre-trained using a first training dataset;
   receiving a patch generator including a sequence generator neural network model pre-trained using a second training dataset;
   training the code retriever and the patch generator using a multi-stage training process,
      wherein a first stage training is performed by training the code retriever using a third training dataset with access to ground-truth bug-fix code pairs; and
      wherein a second stage training is performed by training the patch generator using a fourth training data set without access to the ground-truth bug-fix code pairs;
   receiving a first source input buggy code; and
      wherein a third stage training is performed by training the code retriever using a fifth training data set including pairs of a bug code and a fix code by considering the bug code as a query and the corresponding fix code as a key;

generating, using a retriever encoder of the code retriever, a first representation of the first source input buggy code;

retrieving, using the code retriever based on the first representation, a first bug-fix code pair from a first plurality of bug-fix code pairs, generating a first augmented source input buggy code based on the first source input buggy code and the first bug-fix code pair by concatenating the first bug-fix code pair with the first source input buggy code; and generating, via the patch generator, a fixed code patch based on the first augmented source input buggy code.

7. The non-transitory machine-readable medium of claim 6, wherein the code retriever is configured to perform retrieval based on at least one of a lexical similarity and a semantical similarity with the first source input buggy code.

8. The non-transitory machine-readable medium of claim 7, wherein the code retriever is configured to perform retrieval based on a combination of the lexical similarity and the semantical similarity with the first source input buggy code.

9. The non-transitory machine-readable medium of claim 6, wherein the patch generator includes a Transformer-based neural network model for sequence generation.

10. The non-transitory machine-readable medium of claim 6, wherein the first bug-fix code pair of the first augmented source input buggy code is used as a guiding fix pattern for the patch generator, and wherein the first bug-fix code pair is used for training a semantic-based retriever of the code retriever.

11. A system, comprising:

a non-transitory memory; and one or more hardware processors coupled to the non-transitory memory and configured to read instructions from the non-transitory memory to cause the system to perform a method comprising:

receiving a code retriever including a retriever encoder pre-trained using a first training dataset;

receiving a patch generator including a sequence generator neural network model pre-trained using a second training dataset;

training the code retriever and the patch generator using a multi-stage training process, wherein a first stage training is performed by training the code retriever using a third training dataset with access to ground-truth bug-fix code pairs; and wherein a second stage training is performed by training the patch generator using a fourth training data set without access to the ground-truth bug-fix code pairs; and wherein a third stage training is performed by training the code retriever using a fifth training data set including pairs of a bug code and a fix code by considering the bug code as a query and the corresponding fix code as a key;

receiving a first source input buggy code;

generating, using a retriever encoder of the code retriever, a first representation of the first source input buggy code;

retrieving, using the code retriever based on the first representation, a first bug-fix code pair from a first plurality of bug-fix code pairs, generating a first augmented source input buggy code based on the first source input buggy code and the first bug-fix code pair by concatenating the first bug-fix code pair with the first source input buggy code; and generating, via the patch generator, a fixed code patch based on the first augmented source input buggy code.

12. The system of claim 11, wherein the code retriever is configured to perform retrieval based on at least one of a lexical similarity and a semantical similarity with the first source input buggy code.

13. The system of claim 12, wherein the code retriever is configured to perform retrieval based on a combination of the lexical similarity and the semantical similarity with the first source input buggy code.

14. The system of claim 11, wherein the patch generator includes a Transformer-based neural network model for sequence generation.

15. The system of claim 11, wherein the first bug-fix code pair of the first augmented source input buggy code is used as a guiding fix pattern for the patch generator, and wherein the first bug-fix code pair is used for training a semantic-based retriever of the code retriever.

* * * * *